(12) United States Patent
Bruno et al.

(10) Patent No.: US 7,634,167 B2
(45) Date of Patent: Dec. 15, 2009

(54) OPTICAL PATH FEASIBILITY IN AN OPTICAL COMMUNICATION NETWORK

(75) Inventors: Gianmarco Bruno, Genoa Voltri (IT); Fabio Cavaliere, Vacchiano (IT)

(73) Assignee: Ericsson AB, Stockholm (SE)

( * ) Notice: Subject to any disclaimer, the term of this patent is extended or adjusted under 35 U.S.C. 154(b) by 251 days.

(21) Appl. No.: 11/570,987

(22) PCT Filed: May 31, 2005

(86) PCT No.: PCT/EP2005/052473

§ 371 (c)(1),
(2), (4) Date: Nov. 28, 2007

(87) PCT Pub. No.: WO2006/000510

PCT Pub. Date: Jan. 5, 2006

(65) Prior Publication Data

US 2008/0273873 A1    Nov. 6, 2008

(30) Foreign Application Priority Data

Jun. 24, 2004 (IT) .................. MI2004 001285

(51) Int. Cl.
*G02B 6/00* (2006.01)

(52) U.S. Cl. .................. 385/147; 385/15; 385/24; 398/9; 398/25; 398/28; 398/29

(58) Field of Classification Search ............ 385/15, 385/24, 147; 398/9, 25, 28, 29
See application file for complete search history.

(56) References Cited

U.S. PATENT DOCUMENTS

| | | | |
|---|---|---|---|
| 5,598,403 A * | 1/1997 | Tatsuki | 370/221 |
| 6,219,161 B1 * | 4/2001 | Chang et al. | 398/79 |
| 2002/0097460 A1 | 7/2002 | Ikoma et al. | |

FOREIGN PATENT DOCUMENTS

EP    1237392    9/2002

* cited by examiner

*Primary Examiner*—Jennifer Doan
(74) *Attorney, Agent, or Firm*—Coats & Bennett, P.L.L.C.

(57) ABSTRACT

A method of assessing the feasibility of a composite optical path in an optical communications network in which the composite path is composed of two optical paths k1 and k2 is described. The method comprising the steps of defining, for each individual optical path k and with type i interface, at least one parameter indicating its feasibility, calculating a quality Q factor $Q'\_i,k1+k2$ of the signal for the composite path, estimated considering the deterioration which affects transmission over the paths k1 and k2 and comparing this quality $Q'\_i,k1+k2$ with a value $Qbare\_i$ which is defined as the lowest value which can be taken on by a mapping function $Q\_i(.)$ for interface i and which gives the Q factor as a function of the OSNR received evaluated under the conditions that are considered to be the worst case that can be accepted while ensuring the desired signal quality.

8 Claims, 2 Drawing Sheets

OPTICAL PATH FEASIBILITY IN AN OPTICAL COMMUNICATION NETWORK

The present invention relates to a method of assessing optical path feasibility in an optical communication network. More particular, though not exclusively, the invention concerns assessing path feasibility in a Wavelength Division Multiplexing (WDM) optical network having limited wavelength conversion and regeneration capability.

Recent developments in optical and photonic technology have made feasible all-optical networks and all-optical cross connection (OXC) systems. Eliminating the need for regeneration and wavelength conversion provides an obvious economic advantage, but places constraints on light path lengths and in wavelength contention (different connections with the same wavelength). To lower the cost of the network whilst avoiding complex limitation in path set up, many all-optical networks are made up of OXCs which include limited conversion (regeneration) ability.

Whatever the routing protocol, an efficient way of gathering all information from the several optical links connected by OXCs belonging to the required light path, and a robust and yet simple way of assessing the feasibility of transmission of a light path over the resulting combined link, is required.

Figure 1:
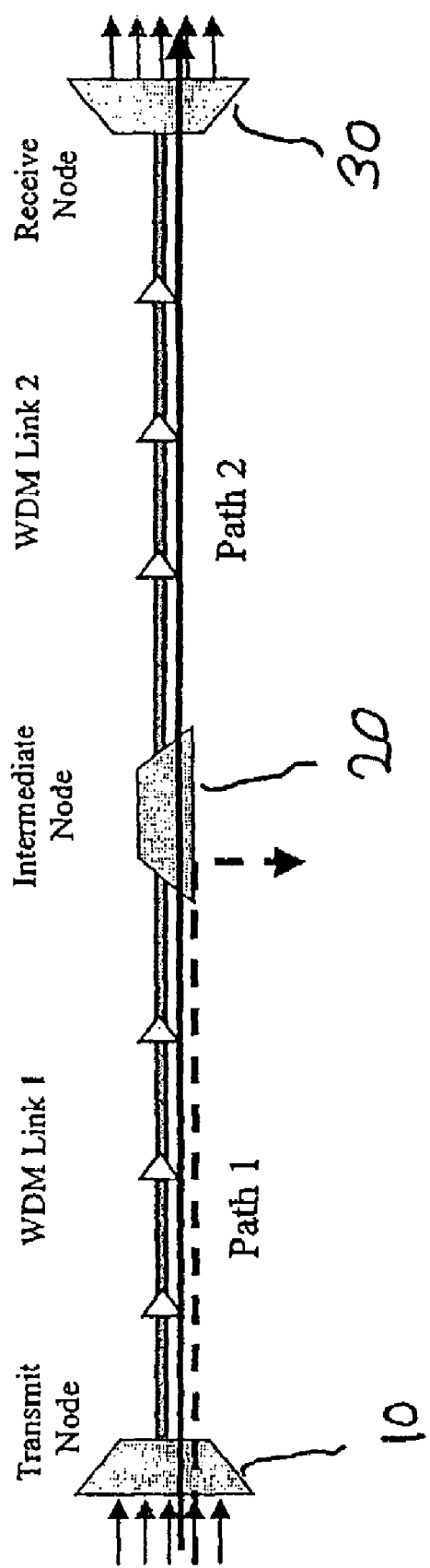

To illustrate the problem addressed by the invention, a part of a WDM network is now considered with reference to FIG. 1. The network comprises a transmit node 10 which is connected to a receive node 30 by an intermediate node 20. A first WDM link 1 (connection 1) connects the transmit node 10 to the intermediate node 20 and a second WDM link 2 (connection 2) connects the intermediate node 20 to the receive node 30. An optical channel which follows a path 1 from the transmit node to the intermediate node can be extracted at the intermediate node or can continue along a path 2 towards the receive node. At the terminals of the two WDM connections, all the optical channels are regenerated.

The possibility that the channel might be extracted at a remote receive node further away is of great interest in determining optical path feasibility.

The intermediate node can be made up of various types of device such as optical cross-connect (OXC), a re-configurable Add/Drop optical multiplexer (ROADM), a fixed optical Add/Drop multiplexer, a 3R regenerator, a node of a WDM metropolitan ring etc.

Each of these devices brings with it practical problems with which designers of WDM networks must deal daily.

For example, the use of an OXC makes sense only if the feasibility of path 1+path 2 can be guaranteed.

If the intermediate node is a ROADM, a typical situation that can arise for various reasons (for example the traffic matrix changes or the wavelength user ceases to operating etc), is that the wavelength will no longer needs to be dropped at the intermediate node. In this case, the same wavelength could then be used to ensure an enhanced capacity between the transmit and receive nodes at no additional cost to the network operator. Again, this is possible only if path 1+path 2 is feasible.

In the case of a fixed optical Add/Drop multiplexer the situation is similar to the above except that this requires someone has to physically go to the site of the intermediate node to physically connect path 1 to path 2.

As is known 3R regenerators in the intermediate node are used to guarantee a sufficient quality of service between the transmit and receive nodes. As technical evolution improves the equipment performance at the terminal ends, an operator might wish to re-use the same link using equipment of enhanced performance and save the high costs of the 3R regenerators at the intermediate node. Once again, this is only possible if the feasibility of path 1+path 2 can be verified.

Metropolitan networks are often operated by a number of smaller operators. As a result, the traffic matrix has highly time-varying characteristics and the possibility of re-using wavelengths is a key feature for metro system suppliers to be competitive.

Where possible, the above-mentioned issues are dealt with at the network design stage since there is no way for a customer to determine the feasibility of the path 1+path 2 subsequently, for example because the equipment vendor has ceased to support the equipment or no longer exists or hasn't archived the relevant information. In this case the customer is forced to regenerate between path 1 and path 2 even if there is in fact enough margin to allow for all-optical transmission. In the most optimistic scenario the customer has to ask the operator to re-run the network design process to assess the feasibility of new paths, however such work is prohibitively expensive and time consuming.

The general purpose of the present invention is to remedy the above-mentioned shortcomings by making available a method of ascertaining the feasibility of all-optical paths in an optical communications network which has limited regeneration capability. The method is based on the use of a reduced set of physical parameters, metrics, and is consequently both fast and economical.

In view of this purpose the invention provides a method of assessing the feasibility of composite optical path in an optical network, the composite path being composed of two optical paths k1 and k2, the method comprising the steps of: defining, for each individual optical path k and with type i interface, at least one parameter indicating its feasibility, calculating a quality Q factor $Q'\_i,k1+k2$ of the signal for the composite path, estimated considering the deterioration which affects transmission over the paths k1 and k2 and comparing this quality $Q'\_i,k1+k2$ with a value $Qbare\_i$ which is defined as the lowest value which can be taken on by a mapping function $Q\_i(.)$ for interface i and which gives the Q factor as a function of the OSNR received evaluated under the conditions that are considered to be the worst case that can be accepted whilst ensuring the desired signal quality and wherein the composite connection is considered feasible if $Q'\_i,k1+k2 >= Qbare\_i$.

Advantageously the at least one parameter for each different type of interface i and path k is selected from the group comprising of:

$O\_i,k$: is a minimum OSNR with which it is expected to receive the i channel transmitted over the path k under the conditions of the case considered worst;

$Q\_i(.)$: is a mapping function for the interface i which supplies the Q factor as a function of the OSNR received and evaluated under the conditions of the case considered worst;

$Qbare\_i$: is a lowest value that can be taken on by $Q\_i$ ensuring the required signal quality after Forward Error Correction FEC correction;

$Qreq\_i$: is the Q factor required after FEC correction;

$FEC\_i$: is the FEC gain of the optical interface i defined as $FEC\_i = Qreq\_i - Q\_i$ and calculated at $Qreq\_i$;

$PD\_i,k$: is the dispersion penalty that affects the channel i travelling over the path k;

$PNL\_i,k$: is a non-linear propagation penalty that affects the channel i travelling over the path k;

$PPMD\_i,k$: is the Phase Modulated Dispersion PMD penalty that affects the channel i travelling that over the path k; and PL_i,k: is a linear propagation penalty that affects the channel i travelling over the path k which is not due to propagation in the fibre.

Preferably Q'_i,k1+k2 is defined by $$Q'\_i,k1+k2 = (Q\_i,k1+k2) - (PPMD\_i,k1+k2) - (PD\_i,k1+k2) - (PNL\_i,k1+k2) - (PL\_i,k1+k2)$$

where:

Q_i,k1+k2=Q(O_i,k1+k2) with O_i,k1+k2 that is the OSNR of the signal i travelling over the path k1 and then routed over the path k2;

PPMD_i,k1+k2: is the PMD penalty affecting the signal i travelling over the path k1 and then routed over the path k2;

PD_i,k1+k2: is the fibre chromatic dispersion penalty affecting the signal i travelling over the path k1 and then routed over the path k2;

PNL_i,k1+k2: is the non-linear propagation penalty striking the signal i travelling over the path k1 and then routed over the path k2; and PL_i,k1+k2: is the linear distortion penalty not allowed for by the PD penalty affecting the signal i travelling over the path k1 and then routed over the path k2.

Advantageously, (O_i,k1+k2), (PPMD_i,k1+k2), (PD_i,k1+k2), (PNL_i,k1+k2), (PL_i,k1+k2) can be calculated as:

$$O\_i,k1+k2 = O\_i,k1 * O\_i,k2 / (O\_i,k1 + O\_i,k2)$$

where O_i,k1 and O_i,k2 are the OSNR values of the signal i starting and terminating in paths k1 and k2 respectively;

$$PPMD\_i,k1+k2 = (PPMD\_i,k1\textasciicircum 2 + PPMD\_i,k2\textasciicircum 2)\textasciicircum 0.5$$

where PPMD_i,k1 and PPMD_i,k2 are the PMD penalties undergone by the signal i starting and terminating in paths k1 and k2 respectively;

$$PD\_i,k1+k2 = (PD\_i,k1\textasciicircum 0.5 + PD\_i,k2\textasciicircum 0.5)\textasciicircum 2$$

where PD_i,k1 and PD_i,k2 are the chromatic dispersion penalties undergone by the signal i starting and terminating in paths k1 and k2 respectively;

$$PNL\_i,k1+k2 = (PNL\_i,k1\textasciicircum 0.5 + PNL\_i,k2\textasciicircum 0.5)\textasciicircum 2$$

where PNL_i,k1 and PNL_i,k2 are the non-linear propagation penalties undergone by the signal i starting and terminating in paths k1 and k2 respectively; and $$PL\_i,k1+k2 = PL\_i,k1 + PL\_i,k2$$

where PL_i,k1 and PL_i,k2 are the linear distortion penalties undergone by the signal i starting and terminating in paths k1 and k2 respectively.

Figure 2:
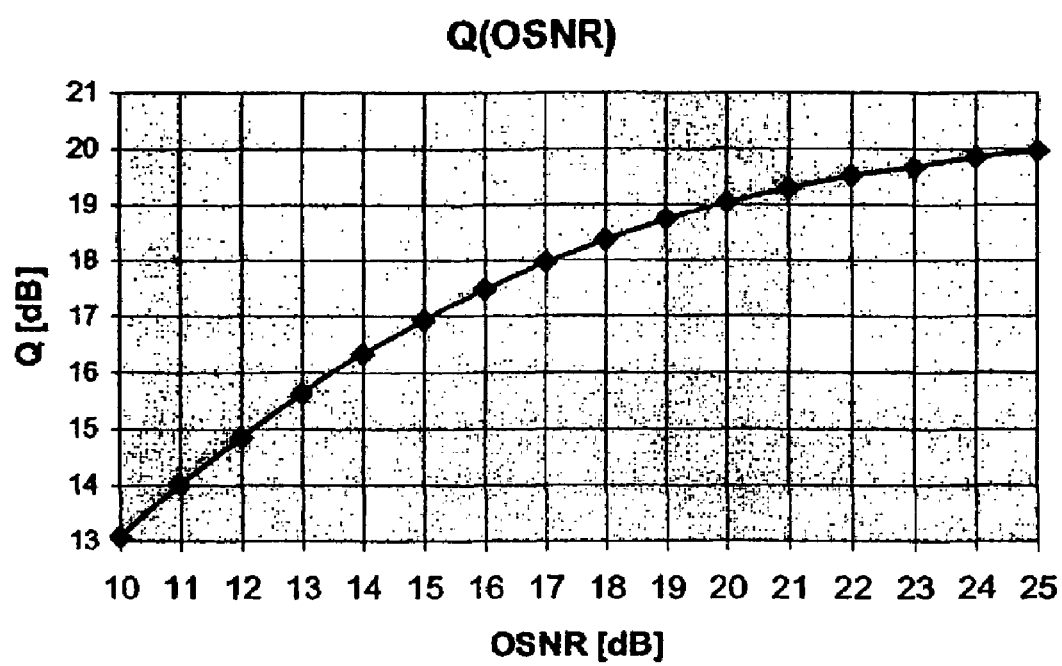

In order that the invention can be better understood a method in accordance with the invention will now be described, by way of example only, with reference to the accompanying drawings in which:

FIG. 1 as hereinbefore described, is a schematic representation of an optical network for illustrating the problem addressed by the invention; and FIG. 2 is an example of a mapping of the Q factor as a function of the OSNR (Optical Signal Noise Ratio).

Firstly, in accordance with the method, metrics (parameters) are defined for each individual optical path, unequivocally defining its feasibility. To do this, for each different type of interface i and path k the following parameters are defined:

O_i,k: is the minimum expected received OSNR for the channel i transmitted over the path k under the worst case conditions of ageing and channel loading.

Q_i(.): is the mapping function for the interface i which provides Q factor [in dB] as a function of the received OSNR [in dB] evaluated in the worst case conditions of ageing and received power. As shown by way of example in FIG. 2, this function can be described in a very simple manner function by a stepwise function or a low-order polynomial interpretation.

Qbare_i: is the lowest value that can be taken by Q_i (i.e. the most degraded signal that can be received) ensuring the required signal quality after Forward Error correction (FEC).

Qreq_i: is the required Q factor after FEC.

FEC_i: is the FEC gain of the optical interface i [in dB] defined as FEC_=Qreq_i-Q_i and calculated at Qreq_i.

PD_i,k: is the dispersion penalty affecting channel i travelling in path k.

PNL_i,k: is the non-linear propagation penalty affecting channel i travelling in path k.

PPMD_i,k: is the Polarization Mode Dispersion (PMD) penalty affecting channel i travelling in path k.

PL_i,k: is the linear propagation penalty affecting channel i travelling in path k which is not due to propagation in the fibre but due to filter distortion.

All of these parameters are calculated once in the network design phase and their values stored and are subsequently used in the method of the invention to assess the feasibility of all new paths.

If a new type of interface j is added, its relevant parameters Qbare_j, Qreq_j, FEC_j, PD_j,k, PNL_j,k, PPMD_j,k, PL_j,k are calculated for each path k and stored.

Assume now that it is wished to verify the feasibility of a composite path made up of a path k1 plus a path k2.

It is assumed that both paths k1 and k2 are feasible separately. This must indeed be so otherwise 3R regeneration would already be present in either link 1 or link 2.

To verify the feasibility of the entire composite path, i.e. the path realized by the sequence of two or more paths (the method involves calculating the metrics for a sequence of two paths which are then used in a subsequent iteration), the above defined parameters are sufficient. In particular, the feasibility of transmission of the interface i over the composite path k1+k2 is advantageously verified as follows.

In particular, the proposed method of calculating metrics for the sequence of two paths is to calculate the quality of the estimated signal (Q factor) considering all the deteriorations affecting the transmission over the paths k1 and k2. Said quality is indicated here by Q'_i,k1+k2.

If Q'_i,k1+k2>=Qbare_i, then the composite link is feasible, otherwise 3R regeneration is required between paths k1 and k2.

Advantageously, in accordance with the present method of calculating Q'_i,k1+k2 the following values are calculated:

O_i,k1+k2: is the OSNR of the signal i travelling over the path k1 and then routed over path k2 where O_I,k1 and O_I,k2 are the OSNR values of the signal i starting and terminating in paths k1 and k2 respectively.

PPMD_i,k1+k2: is the PMD penalty affecting the signal i travelling through the path k1 and then routed over the path k2;

PD_i,k1+k2: is the penalty resulting from chromatic dispersion affecting the signal i travelling over the path k1 and then routed over the path k2;

PNL_i,k1+k2: is the non-linear propagation penalty affecting the signal i travelling over the path k1 and then routed over the path k2; and PL_i,k1+k2 is the linear distortion penalty not accounted for by the PD penalty affecting the signal i travelling over the path k1 and then routed over the path k2. This can arise from multiplexers, demultiplexers, add/drop units etc. PL_i,k1 and PL_i,k2 are the linear distortion penalties affecting the signal i starting and terminating in path k1 and k2 respectively.

Advantageously, said metrics for the sequence of two paths is calculated as follows:

$$O\_i,k1+k2=O\_i,k1*O\_i,k2/(O\_i,k1+O\_i,k2)$$

where O_i,k1 and O_i,k2 are OSNR values of the signal i starting and ending in path k1 and path k2 respectively. All are expressed in linear units;

$$PPMD\_i,k1+k2=(PPMD\_i,k1\char`\^2+PPMD\_i,k2\char`\^2)\char`\^0.5$$

where PPMD_i,k1 and PPMD_i,k2 are the PMD penalties affecting the signal i starting and terminating in paths k1 and k2 respectively. All are expressed in dB;

$$PD\_i,k1+k2=(PD\_i,k1\char`\^0.5+PD\_i,k2\char`\^0.5)\char`\^2$$

where PD_i,k1 and PD_i,k2 are the chromatic dispersion penalties affecting the signal i starting and terminating in paths k1 and k2 respectively. All are expressed in dB;

$$PNL\_i,k1+k2=(PNL\_i,k1\char`\^0.5+PNL\_i,k2\char`\^0.5)\char`\^2$$

where PNL_i,k1 and PNL_i,k2 are the non-linear propagation penalties affecting the signal i starting and terminating in paths k1 and k2 respectively. All are expressed in dB; and $$PL\_i,k1+k2=PL\_i,k1+PL\_i,k2$$

where PL_i,k1 and PL_i,k2 are the linear distortion penalties undergone by the signal i starting and terminating in paths k1 and k2 respectively. All are expressed in dB.

After calculating O_i,k1+k2 (the OSNR at the end of the path k2, for the interface i as described above) Q_i,k1+k2 can be obtained defined as:

$$Q\_i,k1+k2=Q(O\_i,k1+k2)$$

i.e., Q_i,k1+k2 is obtained from the mapping function for the required interface i. This function is the signal quality estimated in a limited propagation only from OSNR, i.e. without chromatic dispersion and no non-linear deterioration.

Now the above-mentioned Q'_i,k1+k2 can be calculated as:

$$Q'\_i,k1+k2=(Q\_i,k1+k2)-(PPMD\_i,k1+k2)-(PD\_i,k1+k2)-(PNL\_i,k1+k2)-(PL\_i,k1+k2)$$

and the verification of the feasibility of the composite path k1+k2 determined if Q'_i,k1+k2>=Qbare_i. If Q'_i,k1+k2>=Qbare_i then the feasibility of the composite path k1+k2 is established.

It is now clear that the predetermined purposes of the present invention have been achieved by making available a method permitting feasibility ascertainment of a composite path easily and rapidly starting from knowledge of only a few predefined parameters.

Naturally the above description of an embodiment applying the innovative principles of the present invention is given by way of non-limiting example of said principles within the scope of the exclusive right claimed here.

The invention claimed is:

1. A method of determining the feasibility of a composite optical path in an optical communications network, the composite optical path being composed of at least two optical paths k1 and k2, the method comprising:

for each individual optical path k having a type i interface in a composite optical path, defining at least one parameter indicating a feasibility of the individual optical path k;

calculating a quality Q factor Q'_i,k1+k2 of an estimated signal to be transmitted over the composite optical path based on one or more factors that cause deterioration of the signal over the individual optical paths k1 and k2;

comparing the quality Q factor with a value Qbare_i, where Qbare_i is defined as the lowest acceptable input value into a mapping function Q_i(.) that, for a given interface i, is configured to output the quality Q factor as a function of an Optical Signal to Noise Ratio (OSNR) received and evaluated under worst case conditions while ensuring the desired signal quality; and verifying that the composite optical path is feasible if Q'_i,k1+k2>=Qbare_i.

2. The method of claim 1 wherein the at least one parameter indicating a feasibility of the individual optical path k is selected from the group consisting of (O_i,k; Q_i; Qbare_i; Qreq_i; FEC_i; PD_i,k; PNL_i,k; PPMD_i,k; and PL_i,k), and where:

O_i,k is a minimum acceptable OSNR value with which the signal transmitted over a channel i of the individual optical path k may be received under worst case conditions;

Qbare_i is the lowest acceptable input value into Q_i after forward Error Correction (FEC);

Qreq_i is the quality Q factor required after FEC;

FEC_i is an FEC gain of the optical interface i, and is defined as FEC_i=Qreq_i−Q_i, and is calculated at Qreq_i;

PD_i,k is a dispersion factor that negatively affects the channel i traveling over the path k;

PNL_i,k: is a non-linear propagation factor that negatively affects the channel i of the individual optical path k;

PPMD_i,k is a Phase Modulated Dispersion (PMD) factor that negatively affects the channel i of the individual optical path k; and PL_i,k is a linear propagation factor that negatively affects the channel i of the individual optical path k independent of an optical fiber propagation.

3. The method of claim 2 wherein the estimated quality Q factor is calculated as:

$$Q'\_i,k1+k2=(Q\_i,k1+k2)-(PPMD\_i,k1+k2)-(PD\_i,k1+k2)-(PNL\_i,k1+k2)-(PL\_i,k1+k2)$$

and where:

Q_i,k1+k2=Q(O_i,k1+k2), with O_i,k1+k2 being defined as the OSNR of the signal to be transmitted over the optical path k1 and routed over the optical path k2;

PPMD_i,k1+k2 is the PMD factor that negatively affects the signal to be transmitted over the optical path k1 and routed over the optical path k2;

PD_i,k1+k2 is the optical fiber chromatic dispersion factor that negatively affects the signal to be transmitted over the optical path k1 and routed over the optical path k2;

PNL_i,k1+k2 is the non-linear propagation factor that negatively affects the signal to be transmitted over the optical path k1 and routed over the optical path k2; and PL_i,k1+k2 is the linear distortion factor that negatively affects the signal to be transmitted over the optical path k1 and routed over the optical path k2, and that is independent of the optical fiber chromatic dispersion factor.

4. The method of claim 3 wherein (O_i,k1+k2) is calculated as:

$$O\_i,k1+k2=O\_i,k1*O\_i,k2/(O\_i,k1+O\_i,k2)$$

where O_i,k1 and O_i,k2 are defined as the OSNR values of the signal starting and terminating in optical paths k1 and k2, respectively.

5. The method of claim 3 wherein (PPMD_i,k1+k2) is calculated as:

$$PPMD\_i,k1+k2=(PPMD\_i,k1^2+PPMD\_i,k2^2)^{0.5}$$

where PPMD_i,k1 and PPMD_i,k2 are the PMD factors that negatively affect the signal starting and terminating in optical paths k1 and k2, respectively.

6. The method of claim 3 wherein (PD_i,k1+k2) is calculated as:

$$PD\_i,k1+k2=(PD\_i,k1^{0.5}+PD\_i,k2^{0.5})^2$$

where PD_i,k1 and PD_i,k2 are the chromatic dispersion factors that negatively affect the signal starting and terminating in optical paths k1 and k2, respectively.

7. The method of claim 3 wherein (PNL_i,k1+k2) is calculated as:

$$PNL\_i,k1+k2=(PNL\_i,k1^{0.5}+PNL\_i,k2^{0.5})^2$$

where PNL_i,k1 and PNL_i,k2 are the non-linear propagation factors that negatively affect the signal starting and terminating in optical paths k1 and k2, respectively.

8. The method of claim 3 wherein (PL_i,k1+k2) is calculated as:

$$PL\_i,k1+k2=PL\_i,k1+PL\_i,k2$$

where PL_i,k1 and PL_i,k2 are the linear distortion factors that negatively affect the signal starting and terminating in optical paths k1 and k2, respectively.

* * * * *